D. MOREY.

Straw-Feeding Attachment for Furnaces.

No. 6,420.

Reissued May 4, 1875.

Witnesses

Geo. H. Strong.

Jas. L. Bonne

Inventor

David Morey by Dewey & Co

Attys

THE GRAPHIC CO. PHOTO.-LITH. 39 & 41 PARK PLACE, N.Y.

UNITED STATES PATENT OFFICE.

DAVID MOREY, OF WATSONVILLE, CALIFORNIA.

IMPROVEMENT IN STRAW-FEEDING ATTACHMENTS FOR FURNACES.

Specification forming part of Letters Patent No. 135,659, dated February 11, 1873; reissue No. 6,420, dated May 4, 1875; application filed April 8, 1875.

*To all whom it may concern:*

Be it known that I, DAVID MOREY, of Watsonville, Santa Cruz county, State of California, have invented a Straw-Feeding Attachment for the Furnaces of Thrashing-Engines; and I do hereby declare the following description and accompanying drawing are sufficient to enable any person skilled in the art or science to which it most nearly appertains to make and use my said invention without further invention or experiment.

My invention relates to an attachment for the doors of boiler-furnaces, and which is more particularly applicable to the doors of the furnaces used on thrashing-engines. The object of my furnace attachment is to enable straw to be fed into the furnace to serve as a fuel, and thus economize in the running of the engine by utilizing the waste straw. My straw-feeding attachment consists of a metal box or tube, open at both ends, and secured horizontally to one side of the furnace-door opening by hinges, so as to serve as a door to the furnace at the same time that it serves as a straw-feeder.

In order to more fully illustrate and explain my invention, reference is had to the accompanying drawing forming a part of this specification, in which—

Figure 1:
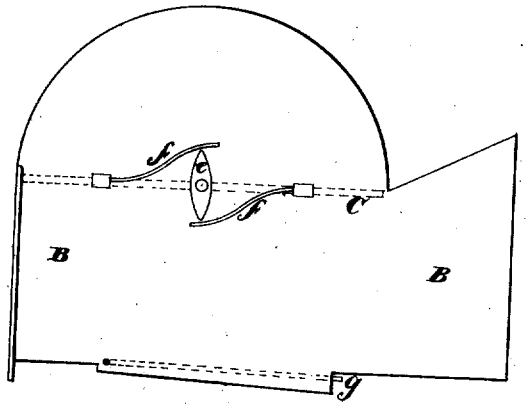
Figure 2:
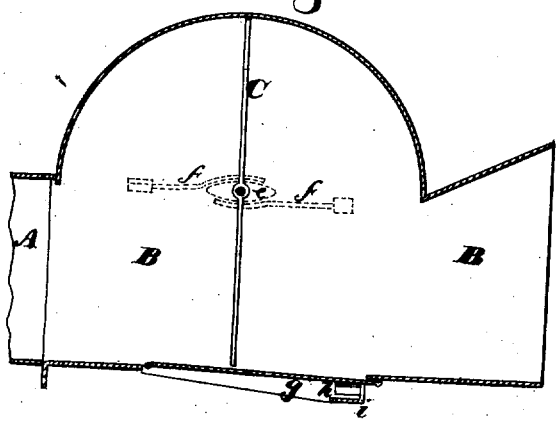

Figure 1 is a side elevation of my machine. Fig. 2 is a longitudinal section.

Let A represent the furnace of a thrashing-engine. B is a box-shaped attachment, which can be made of sheet metal or other suitable material. The box is open at both ends, and has one end attached to the furnace at one side of the door-opening, so that it can be opened and closed in the same manner as a furnace-door. When thus secured to the furnace the box lies horizontally, projecting out from the doorway of the furnace, and its outer extremity is flared, as shown. The upper side of the box is made semicircular, so as to form a chamber inside of it with a semicircular box. Inside of this chamber is a revolving partition, C, which is suspended upon journals at each end, the journals bearing in and passing through the sides of the box. The upper part of the box is made semicircular, to permit the partition to be revolved, while its lower edge fits snugly against the bottom of the box, and also to contract the opening upon both sides of the chamber. As before mentioned, the journals upon which the partition revolves passes to the outside of the box, and each one has a double cam, *e*, secured centrally to it. Flat springs *f f* have one end secured to the outside of the box, so that their free ends shall press upon opposite sides of the cam from opposite directions, and thus keep the partition in the proper position to close the opening and prevent a draft. In the bottom of the box, below the partition C, an opening is made, which is closed by a section, *g*. This section is hinged to the fixed bottom at the end nearest the furnace-door, while the opposite end is supported from below by a spring, *h*, and cross-bar *i*. When the partition C is in its vertical position it stands at right angles to the hinged section near its free end. The office of the partition C is to keep the box or tube closed, and prevent the entrance of air after the straw has been pushed through the tube; but it is evident that by leaving the tube or box filled, so as choke the opening through it, the partition or door can be dispensed with. The straw is introduced into the furnace through the hopper of the box B by means of an ordinary hay-fork. The fork-load of straw is placed against the lower end of the partition C and pushed through the box, the pressure turning the partition to a horizontal position to admit the hay or straw. As soon as the fork is unloaded and withdrawn, the partition is closed automatically by the springs *f f*, which act upon the cams *e*, thus making a half-revolution each time a fork-load of straw is introduced, and immediately closing again, so as to shut off the draft, which is very injurious to the furnace when not admitted in the proper place. In case any straw or other substance should lodge upon the hinged bottom of the box the partition would not be prevented from closing, as the pressure upon it would force the spring end of the bottom downward until it could close.

With this attachment I am enabled to utilize the straw from thrashing-machines for the purposes of making steam, and at the same time effecting a great saving in fuel.

Having thus described my invention, what I claim, and desire to secure by Letters Patent, is—

1. In combination with the furnace A of a thrashing-engine, the detachable box or tube B, provided with a flaring mouth, the base of the tube projecting from the furnace at, or nearly at, a right angle to the front of the furnace, substantially as and for the purpose set forth.

2. In combination with the furnace A of a thrashing engine, the box or tube B, provided with a flaring mouth, and having the partition or door C, substantially as and for the purpose set forth.

3. In combination with a steam-boiler furnace, the detachable feeding-box B, having the revolving partition C and hinged spring-section *g*, substantially as and for the purpose set forth.

4. In combination with the feeding-box, the revolving partition C, elliptical cams *e*, and oppositely-acting springs *f f*, substantially as and for the purpose above described.

DAVID MOREY.

Witnesses:
A. J. JENNINGS,
J. S. MENASCO.